United States Patent
Todd

[11] Patent Number: 6,155,348
[45] Date of Patent: Dec. 5, 2000

[54] STIMULATING UNCONSOLIDATED PRODUCING ZONES IN WELLS

[75] Inventor: Bradley L. Todd, Duncan, Okla.

[73] Assignee: Halliburton Energy Services, Inc.

[21] Appl. No.: 09/318,538

[22] Filed: May 25, 1999

[51] Int. Cl.$^7$ .................... E21B 33/138; E21B 43/267
[52] U.S. Cl. .................... 166/280; 166/281; 166/295; 166/299; 166/300
[58] Field of Search .................... 166/276, 280, 166/281, 286, 295, 299, 300, 308

[56] References Cited

U.S. PATENT DOCUMENTS

| | | | |
|---|---|---|---|
| 3,525,398 | 8/1970 | Fisher | 166/288 |
| 3,608,639 | 9/1971 | Hart | 166/308 |
| 3,815,680 | 6/1974 | McGuire et al. | 166/281 |
| 3,854,533 | 12/1974 | Gurley et al. | 166/276 |
| 4,042,032 | 8/1977 | Anderson et al. | 166/276 |
| 4,070,865 | 1/1978 | McLaughlin . | |
| 4,074,760 | 2/1978 | Copeland et al. | 166/276 |
| 4,105,073 | 8/1978 | Brieger | 166/286 |
| 4,336,842 | 6/1982 | Graham et al. | 166/276 |
| 4,649,998 | 3/1987 | Friedman | 166/294 |
| 4,823,875 | 4/1989 | Hill | 166/280 |
| 4,829,100 | 5/1989 | Murphey et al. | 523/131 |
| 4,917,188 | 4/1990 | Fitzpatrick, Jr. | 166/295 |
| 4,936,385 | 6/1990 | Weaver et al. | 166/295 X |
| 5,058,676 | 10/1991 | Fitzpatrick et al. | 166/278 |
| 5,105,886 | 4/1992 | Strubhar et al. | 166/280 |
| 5,128,390 | 7/1992 | Murphey et al. | 523/130 |
| 5,145,013 | 9/1992 | Dees et al. | 166/295 |
| 5,381,864 | 1/1995 | Nguyen et al. | 166/280 |
| 5,492,178 | 2/1996 | Nguyen et al. | 166/276 |
| 5,623,993 | 4/1997 | Van Buskirk et al. | 166/281 X |
| 5,944,105 | 8/1999 | Nguyen | 166/281 X |
| 5,960,880 | 10/1999 | Nguyen et al. | 166/280 |
| 6,003,600 | 12/1999 | Nguyen et al. | 166/281 |

*Primary Examiner*—George Suchfield
*Attorney, Agent, or Firm*—Robert A. Kent

[57] ABSTRACT

The present invention provides improved methods of stimulating fluid production from an unconsolidated formation penetrated by a well bore while reducing or preventing the migration of formation sands with fluids produced from the formation. The methods basically comprise the steps of placing an explosive in the well bore adjacent to the zone, creating at least one fracture extending from the well bore into the zone, depositing a hardenable resin composition coated proppant in the fracture with some of the resin composition coated proppant also being deposited in the well bore, causing the resin composition to harden and then detonating the explosive to thereby break up and cause the removal of at least a portion of the consolidated proppant in the well bore.

20 Claims, No Drawings

STIMULATING UNCONSOLIDATED PRODUCING ZONES IN WELLS

BACKGROUND OF THE INVENTION

1. Field of the Invention

The present invention relates generally to improved methods of stimulating wells in unconsolidated formations, and more particularly, to methods of stimulating fluid production from such wells while reducing or preventing the migration of sand with the fluids produced therefrom.

2. Description of the Prior Art

Oil and gas wells are often completed in unconsolidated formations containing loose and incompetent sands which migrate with oil, gas and/or water produced by the wells. The presence of sand in the produced fluids is disadvantageous and undesirable in that the sand particles abrade pumping and other producing equipment and reduce the fluid production capabilities of the producing zones in the wells.

Incompetent subterranean formations include those which contain loose sands that are readily entrained by produced fluids and those wherein the sand particles making up the formations are bonded together with insufficient bond strength to withstand the forces produced by the production of fluids from the formations. A technique which is often used for minimizing sand production from such formations is to produce fluids from the formations at low flow rates whereby the near well stabilities of sand bridges and the like in the formations are preserved. However, the collapse of such sand bridges often occurs as a result of unintentional high production rates and pressure surging.

Heretofore, producing zones in unconsolidated formations have been treated by creating fractures in the zones and depositing hardenable resin composition coated proppant in the fractures to maintain the fractures in open positions. The hardenable resin composition coating on the proppant is caused to harden after the coated proppant has been deposited in the fractures thereby consolidating the proppant into hard permeable masses therein which reduces or prevents the migration of sand through the fractures with produced fluids.

A problem which accompanies the use of resin composition coated proppant in fractures formed in unconsolidated formations involves the excess coated proppant which is left in the well bore after coated proppant is deposited in the fractures. The excess resin composition coated proppant settles in the well bore adjacent to the fractured zone and hardens into a hard permeable mass therein. As a result, it has heretofore been necessary to drill out the hardened resin composition coated proppant in the well bore in order to allow produced fluids to more freely flow into the well bore from the fractures and to provide access to the producing interval in the event it is necessary to carry out remedial procedures therein.

Thus, there is a need for improved methods of stimulating wells formed in unconsolidated hydrocarbon producing formations whereby excess hardened resin composition coated proppant remaining in the well bore is easily and inexpensively removed.

SUMMARY OF THE INVENTION

The present invention provides improved methods of stimulating fluid production from unconsolidated subterranean zones penetrated by well bores which meet the needs described above and overcome the deficiencies of the prior art. The methods are basically comprised of the following steps. An explosive which can be remotely detonated from the surface is first placed in the well bore adjacent to the zone to be stimulated. At least one fracture is then created which extends from the well bore into the zone. Hardenable resin composition coated proppant is deposited in the fracture by way of the well bore with some of the resin composition coated proppant also being deposited in the well bore adjacent to the zone and around the explosive therein. The resin composition is caused to harden whereby the proppant deposits in the fracture and the well bore are consolidated into hard permeable masses. Thereafter, the explosive is detonated to break up and cause the removal of at least a substantial portion of the consolidated proppant in the well bore. The permeable proppant mass in the fracture functions to filter out and reduce or prevent the migration of formation sand with fluids produced through the fracture into the well bore.

Thus, it is a general object of the present invention to provide improved methods of stimulating fluid production from unconsolidated subterranean zones penetrated by well bores while reducing or preventing the migration of formation sands with fluids produced from the zones.

A further object of the present invention is to provide improved methods of fracture stimulating fluid production from unconsolidated subterranean zones whereby proppant deposited in the fractures is consolidated into hard permeable masses and excess consolidated proppant in the well bores penetrating the zones is readily and efficiently removed therefrom.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods of stimulating fluid production from unconsolidated subterranean zones penetrated by well bores while reducing or preventing the migration of formation sands with fluids produced from the zones. The methods utilize a hardenable resin composition coated proppant which is placed in fractures formed in the zones.

During the placement of resin composition coated proppant in fractures formed in a producing zone, excess resin coated proppant is also deposited in the well bore adjacent to the zone. Heretofore, after the deposits of consolidated resin coated proppant in the fractures and in the well bore have consolidated into hard permeable masses, the consolidated proppant mass in the well bore has been removed by the inefficient and costly process of drilling it out of the well bore. The improved methods of the present invention quickly and efficiently remove the hardened resin coated proppant from the well bore and eliminate the necessity of drilling it out.

The methods of this invention are basically comprised of the steps of first placing an explosive which is detonatable from the surface in the well bore adjacent to the producing zone to be stimulated. At least one fracture is next created extending from the well bore into the zone and hardenable resin composition coated proppant is deposited in the zone by way of the well bore. Some of the resin composition coated proppant is also deposited in the well bore adjacent to the zone around the explosive therein. The resin composition is caused to harden whereby the proppant deposits in the fracture and in the well bore are consolidated into hard permeable masses. Thereafter, the explosive is detonated to thereby break up and cause the removal of at least a substantial portion of the consolidated proppant in the well bore. The consolidated proppant in the fracture filters out and prevents the migration of formation sand with fluids produced through the fracture into the well bore.

The removal of at least some or all of the consolidated proppant from the well bore allows produced fluids from the fractures to more freely flow into the well bore and allows subsequent access to the producing zone by way of the well bore in the event remedial procedures are required therein. While the methods of this invention can be performed in subterranean zones penetrated by open hole well bores, they are particularly suitable for use in subterranean zones penetrated by well bores having casing strings cemented therein and which are communicated with the zones by spaced perforations.

A variety of remotely detonatable explosives can be utilized in accordance with the present invention. However, a remotely detonatable explosive in the form of at least one elongated explosive cord which can be suspended in the well bore adjacent to the subterranean zone to be stimulated is particularly suitable. A bundle of two or more elongated explosive cords is generally preferred. The explosive cord or bundle of such cords are preferably connected to an electric detonator which is in turn connected to and suspended in the well bore by an electric wire line. A particularly suitable elongated explosive cord for use in accordance with this invention contains 80 grains per foot of HMX (cyclotetramethylenetetranitramine) explosive material having an extra high velocity confined in a nylon jacket. Such explosive cords identified as 80 gr/ft. HMX XHV detonating cord are commercially available from the Ensign Bickford Company of Smisbury, Connecticut.

The explosive cord can be utilized as a single strand or in bundles having from 2 to 12 or more strands depending upon the diameter of the well bore, the strength of the casing, if any, and the strength of the hardenable resin composition used for consolidating the proppant. As mentioned, the present invention is most effectively utilized in well bores which have perforated casing strings cemented therein. The presence of the casing protects the producing zone from damage and allows the use of greater quantities of explosive to be used.

The hardenable resin compositions which are useful in accordance with the present invention for consolidating proppant deposited in subterranean fractures are generally comprised of a hardenable organic resin and a resin-to-sand coupling agent. Such resin compositions are well known to those skilled in the art as are their use for consolidating particulate materials such as fracture proppant into hard permeable masses. A number of such compositions are described in detail in U.S. Pat. No. 4,042,032 issued to Anderson et al. on Aug. 16, 1977, U.S. Pat. No. 4,070,865 issued to McLaughlin on Jan. 31, 1978, U.S. Pat. No. 5,058,676 issued to Fitzpatrick et al. on Oct. 22, 1991 and U.S. Pat. No. 5,128,390 issued to Murphey et al. on Jul. 7, 1992, all of which are incorporated herein by reference. The hardenable organic resin composition used is preferably a liquid at 80° F. and is cured or hardened by heating or by contact with a hardening agent.

Examples of hardenable organic resins which are particularly suitable for use in accordance with this invention are novolak resins, polyepoxide resins, polyester resins, phenol-aldehyde resins, urea-aldehyde resins, furan resins and urethane resins. These resins are available at various viscosities, depending upon the molecular weight of the resin. The preferred viscosity of the organic resin used in accordance with this invention is in the range of from about 1 to about 1,000 centipoises at 80° F. However, as will be understood, resins of higher viscosities can be utilized when mixed or blended with one or more diluents. Examples of suitable diluents for polyepoxide resins are styrene oxide, octylene oxide, furfuryl alcohol, phenols, furfural, liquid monoepoxides such as allyl glycidyl ether, and liquid diepoxides such as diglycidyl ether or resorcinol. Examples of such diluents for furfuryl alcohol resins, phenol-aldehyde resins and urea-aldehyde resins include, but are not limited to, furfuryl alcohol, furfural, phenol and cresol. Diluents which are generally useful with all of the various resins mentioned above include phenols, formaldehydes, furfuryl alcohol and furfural.

The resin-to-sand coupling agent is utilized in the hardenable resin compositions to promote coupling or adhesion to proppant, sand and other silicious materials in the formation to be treated. A particularly suitable such coupling agent is an aminosilane compound or a mixture of aminosilane compounds selected from the group consisting of N-β-(aminoethyl)-γ-aminopropyltrimethoxysilane, N-β (aminoethyl)-N-β- (amino-ethyl)-γ-aminopropyltrimethoxysilane, N-β-(aminopropyl)-N-β-(aminobutyl)-γ-aminopropyltriethoxysilane and N-β-(amino-propyl)-γaminopropyltriethoxysilane. The most preferred coupling agent is N-β-(aminoethyl)-γ-aminopropyltrimethoxy-silane.

As mentioned, the hardenable resin composition used is caused to harden by heating in the formation or by contact with a hardening agent. When a hardening agent is utilized, it can be an internal hardening agent which is included in the resin composition or it can be an external hardening agent which is used by contacting the resin composition with the external hardening agent after the resin composition has been placed in the subterranean zone. An internal hardening agent is selected for use that causes the resin composition to harden after a period of time sufficient for the resin composition to be placed in the subterranean zone. Retarders or accelerators to lengthen or shorten the cure times are also utilized. When an external hardening agent is used, the hardenable resin composition coated proppant is first placed in the zone followed by an overflush solution containing the external hardening agent.

Suitable internal hardening agents for hardening resin compositions containing polyepoxide resins include, but are not limited to, amines, polyamines, amides and polyamides. A more preferred internal hardening agent for polyepoxide resins is a liquid eutectic mixture of amines and methylene dianiline diluted with methyl alcohol. Examples of internal hardening agents which can be used with resin compositions containing furan resins, phenol-aldehyde resins, urea-aldehyde resins and the like are hexachloroacetone, 1,1,3-trichlorotrifluoro-acetone, benzotrichloride, benzylchloride and benzalchloride.

Examples of external hardening agents for consolidating furan resins, phenol-aldehyde resins and urea-aldehyde resins are acylhalide compounds, benzotrichloride, acetic acid, formic acid and inorganic acids such as hydrochloric acid. Generally, external hardening agents selected from the group consisting of inorganic acids, organic acids and acid producing chemicals are preferred. The hardenable resin compositions can also include surfactants, dispersants and other additives well known to those skilled in the art.

The creation of fractures in a subterranean formation utilizing a hydraulic fracturing process is also well known to those skilled in the art. In accordance with this invention, the hydraulic fracturing process involves pumping a viscous fracturing fluid containing suspended hardenable resin composition coated particulate proppant into the subterranean zone to be fractured at a rate and pressure whereby one or more fractures are created therein. The continued pumping of the fracturing fluid extends the fractures in the zone and carries the resin coated proppant into the fractures. Upon the reduction of the flow of the fracturing fluid and the reduction in pressure exerted on the formation, the resin coated proppant is deposited in the fractures and the fractures are prevented from closing by the presence of the proppant therein. As mentioned above, when the resin coated proppant is deposited in the fractures, excess resin coated proppant is also deposited in the portion of the well bore adjacent to the fractured zone.

Typical fracturing fluids which have been utilized heretofore include gelled water or oil base liquids, foams and emulsions. The foams utilized have generally been comprised of water based liquids containing one or more foaming agents foamed with a gas such as nitrogen. Emulsions formed with two or more immiscible liquids have also been utilized. A particularly useful emulsion for carrying out formation fracturing procedures is comprised of a water based liquid and a liquified, normally gaseous fluid such as carbon dioxide. Upon pressure release, the liquified gaseous fluid vaporizes and rapidly flows out of the formation.

The most common fracturing fluid utilized is comprised of an aqueous liquid such as fresh water or salt water combined with a gelling agent for increasing the viscosity of the fluid. The increased viscosity reduces fluid loss and allows the fracturing fluid to transport significant concentrations of proppant into the created fractures.

A variety of gelling agents have been utilized including hydratable polymers which contain one or more of the functional groups such as hydroxyl, cis-hydroxyl, carboxyl, sulfate, sulfonate, amino or amide. Particularly useful such polymers are polysaccharide and derivatives thereof which contain one or more of the monosaccharide units galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan. Hydratible synthetic polymers and copolymers which contain the above mentioned functional groups and which have been utilized heretofore include polyacrylate, polymethacrylate, polyacrylamide, maleic anhydride, methylvinyl ether polymers, polyvinyl alcohol and polyvinylpyrrolidone.

Preferred hydratible polymers which yield high viscosities upon hydration, i.e., apparent viscosities in the range of from about 10 centipoises to about 90 centipoises at concentrations in the range of from about 10 pounds per 1,000 gallons to about 80 pounds per 1,000 gallons in water, are guar gum and guar derivatives such as hydroxypropylguar and carboxymethylguar, cellulose derivatives such as hydroxyethyl cellulose, carboxymethyl cellulose and carboxymethylhydroxyethyl cellulose, locust bean gum, carrageenan gum and xanthan gum.

The viscosities of aqueous polymer solutions of the types described above can be increased by combining crosslinking agents with the polymer solutions. Examples of crosslinking agents which can be utilized are multivalent metal salts or other compounds which are capable of releasing metal ions in an aqueous solution. Examples of such multivalent metal ions are chromium, zirconium, antimony, titanium, iron (ferrous or ferric), zinc or aluminum.

The above described gelled or gelled and cross-linked fracturing fluids can also include gel breakers such as those of the enzyme type, the oxidizing type or the acid buffer type which are well known to those skilled in the art. The gel breakers cause the viscous fracturing fluids to revert to thin fluids that can be produced back to the surface after they have been used to create fractures and carry proppant in a subterranean zone.

As mentioned above, the proppant functions to prevent the fractures from closing due to overburden pressures, i.e., to prop the fractures open whereby produced fluids can flow through the fractures. Also, the proppant is of a size such that formation sands migrating with produced fluid are prevented from flowing through the flow channels formed by the fractures, i.e., the proppant filters out the migrating sand. Various kinds of particulate materials can be utilized as proppant in accordance with the present invention including sand, bauxite, ceramic materials, glass materials, "TEFLON" materials and the like. The particulate material used can have a particle size in the range of from about 2 to about 400 mesh, U.S. Sieve Series. The preferred particulate material is sand having a particle size in the range of from about 10 to about 70 mesh, U.S. Sieve Series. Preferred sand particle size distribution ranges are 1 or more of 10–20 mesh, 20–40 mesh, 40–60 mesh or 50–70 mesh, depending on the particle size and distribution of the formation sand to be screened out by the proppant.

The proppant size and distribution are carefully selected in accordance with the size and distribution of the formation sand and the proppant is coated with a hardenable resin composition of the type described above. The resin coated proppant can be prepared in accordance with conventional batch mixing techniques followed by the suspension of the resin coated proppant in the fracturing fluid utilized. Alternatively, the fracturing fluid containing resin coated proppant can be prepared in a substantially continuous manner such as in accordance with the methods disclosed in U.S. Pat. No. 4,829,100 issued on May 9, 1989 to Murphey et al. or U.S. Pat. No. 5,128,390 issued on Jul. 7, 1992 to Murphey et al., both of which are incorporated herein by reference.

A preferred method of the present invention for stimulating fluid production from an unconsolidated subterranean zone penetrated by a well bore having a perforated casing string cemented therein while reducing or preventing the migration of formation sands with fluids produced from the zone is comprised of the following steps. An explosive comprised of at least one elongated explosive cord detonatable from the surface is suspended in the casing string adjacent to the perforations. One or more fractures extending from one or more of the perforations into the zone are created and hardenable resin composition coated proppant is deposited in the fracture or fractures by way of the casing string and the perforations. Some of the resin composition coated proppant is also deposited in the casing string adjacent to the perforations and around the elongated explosive cord suspended therein. The resin composition is caused to harden whereby the proppant is consolidated into a hard permeable mass in the fracture or fractures and in the well bore. After the resin composition hardens, the elongated explosive cord is detonated thereby breaking up and causing the removal of at least a central portion of the consolidated proppant in the casing string. Preferably, the detonation of the elongated explosive cord rubbelizes and causes the removal of enough of the consolidated resin coated proppant in the casing string adjacent to the perforations and the fractured zone to allow produced fluids to freely flow into the well bore and to allow access to the entire perforated producing interval so that remedial procedures can be carried out therein if and when such procedures are necessary. Thus, the improved methods of this invention eliminate the need for the heretofore utilized costly and time consuming step of drilling out consolidated resin coated proppant remaining in the well bore adjacent to the producing formation.

The present invention is thus well adapted to carry out the objects and attain the benefits and advantages mentioned as well as those which are inherent therein. While numerous changes to the apparatus and methods can be made by those skilled in the art, such changes are encompassed within the spirit of this invention as defined by the appended claims.

What is claimed is:

1. An improved method of stimulating fluid production from an unconsolidated subterranean zone penetrated by a well bore comprising the steps of:
   (a) placing an explosive in said well bore adjacent to said zone;
   (b) creating at least one fracture extending from said well bore into said zone;
   (c) depositing hardenable resin composition coated proppant in said fracture by way of said well bore, some of said resin composition coated proppant also being deposited in said well bore adjacent to said zone and around said explosive;
   (d) causing said resin composition to harden whereby said proppant is consolidated into a hard permeable mass which filters out and prevents the migration of formation sand with fluids produced through said fracture into said well bore; and
   (e) detonating said explosive to thereby break up and cause the removal of at least a portion of said consolidated proppant in said well bore.

2. The method of claim 1 wherein said explosive is in the form of at least one elongated explosive cord.

3. The method of claim 1 wherein said explosive is comprised of a bundle of two or more elongated explosive cords.

4. The method of claim 1 wherein said well bore includes a casing string cemented therein which is communicated with said subterranean zone by a plurality of spaced perforations extending through said cemented casing string into said zone.

5. The method of claim 1 wherein said hardenable resin composition is comprised of an organic resin selected from the group consisting of novolak resins, polyepoxide resins, polyester resins, phenol-aldehyde resins, urea-aldehyde resins, furan resins and urethane resins.

6. The method of claim 5 wherein said hardenable resin composition is caused to harden by being heated in said zone.

7. The method of claim 5 wherein said hardenable resin composition further comprises an internal hardening agent which causes said resin to harden after being deposited in said zone in accordance with step (c).

8. The method of claim 5 which further comprises the step of contacting said hardenable resin composition with an external hardening agent in said zone thereby causing said resin composition to harden.

9. The method of claim 7 wherein said hardenable resin composition is comprised of a polyepoxide resin and said internal hardening agent is a liquid eutectic mixture of amines and methylene dianiline diluted with methyl alcohol.

10. The method of claim 8 wherein said hardenable resin composition is a furan resin and said external hardening agent is hydrochloric acid.

11. The method of claim 1 wherein said fracture is created in accordance with step (b) by pumping a fracturing fluid into said zone at a sufficient rate and pressure to fracture said zone.

12. The method of claim 10 wherein said hardenable resin composition coated proppant is suspended in said fracturing fluid and is deposited in said fracture and in said well bore in accordance with step (c) by said fracturing fluid.

13. An improved method of stimulating fluid production from an unconsolidated subterranean zone penetrated by a well bore having a perforated casing string cemented therein while reducing or preventing the migration of formation sands with fluids produced from said zone comprising the steps of:
   (a) suspending an explosive comprised of at least one elongated explosive cord in said casing string adjacent to said perforations;
   (b) creating one or more fractures extending from one or more of said perforations into said zone;
   (c) depositing hardenable resin composition coated proppant in said fracture or fractures by way of said casing string and said perforations, some of said resin composition coated proppant also being deposited in said casing string adjacent to said perforations and around said explosive cord;
   (d) causing said resin composition to harden whereby said proppant is consolidated into a hard permeable mass which filters out and prevents the migration of formation sand with fluids produced through said fracture or fractures and said perforations into said casing string; and
   (e) detonating said explosive to thereby break up and cause the removal of at least a central portion of said consolidated proppant in said casing string.

14. The method of claim 13 wherein said explosive is comprised of a bundle of two or more elongated explosive cords.

15. The method of claim 13 wherein said hardenable resin composition is comprised of an organic resin selected from the group consisting of novolak resins, polyepoxide resins, polyester resins, phenol-aldehyde resins, urea-aldehyde resins, furan resins and urethane resins.

16. The method of claim 15 wherein said hardenable resin is caused to harden by being heated in said zone.

17. The method of claim 15 wherein said hardenable resin composition further comprises an internal hardening agent which causes said resin to harden after being deposited in said zone in accordance with step (c).

18. The method of claim 17 wherein said hardenable resin composition is comprised of a polyepoxide resin and said internal hardening agent is a liquid eutectic mixture of amines and methylene dianiline diluted with methyl alcohol.

19. The method of claim 13 wherein said fracture is created in accordance with step (b) by pumping a fracturing fluid into said zone at a sufficient rate and pressure to fracture said zone.

20. The method of claim 13 wherein said hardenable resin composition coated proppant is suspended in said fracturing fluid and is deposited in said fractures in accordance with step (c) by said fracturing fluid.

* * * * *